United States Patent [19]

Bell

[11] Patent Number: 5,424,945
[45] Date of Patent: Jun. 13, 1995

[54] SYSTEM FOR EVALUATING A PSYCHOLOGICAL EFFECT OF A DOCUMENT

[75] Inventor: Jean P. Bell, Ontario, N.Y.

[73] Assignee: Xerox Corporation, Stamford, Conn.

[21] Appl. No.: 113,630

[22] Filed: Aug. 31, 1993

[51] Int. Cl.⁶ .................. G06F 19/00; G06F 17/60
[52] U.S. Cl. ..................... 364/419.2; 364/413.01; 364/401
[58] Field of Search ............... 364/413.01, 413.02, 364/419.2, 419.08, 400, 401, 512; 395/140-149, 150, 151; 382/10, 14

[56] References Cited

U.S. PATENT DOCUMENTS

| | | | |
|---|---|---|---|
| 4,800,510 | 1/1989 | Vinberg et al. | 395/140 |
| 4,831,546 | 5/1989 | Mitsuta et al. | 364/512 |
| 4,873,643 | 10/1989 | Powell et al. | 364/468 |
| 4,881,197 | 11/1989 | Fischer | 395/600 |
| 4,923,314 | 5/1990 | Blanchard, Jr. et al. | 400/63 |
| 4,930,077 | 5/1990 | Fan | 364/419.2 |
| 4,931,934 | 6/1990 | Snyder | 364/419.2 |
| 5,001,653 | 3/1991 | Buchanan et al. | 364/523 |
| 5,018,083 | 5/1991 | Watanabe et al. | 364/523 |
| 5,038,392 | 8/1991 | Morris et al. | 382/61 |
| 5,072,385 | 12/1991 | Rebeillard et al. | 364/419.2 |
| 5,111,392 | 5/1992 | Malin | 364/401 |
| 5,133,051 | 7/1992 | Handley | 395/148 |
| 5,167,016 | 11/1992 | Bagley et al. | 395/144 |
| 5,208,869 | 5/1993 | Holt | 382/7 |
| 5,251,131 | 10/1993 | Masand et al. | 364/419.08 |
| 5,315,668 | 5/1994 | O'Hair | 382/14 |

OTHER PUBLICATIONS

Tamura, et al.: "Textual Features Corresponding to Visual Perception"; *IEEE Transactions on Systems, Man, & Cybernetics*, Jun. 1978, vol. 8, No. 6, abstract.
Brou, et al: "The Color of Things", *Scientific American*, vol. 255 p. 84; Sep. 1986.
Meilach: "Facing the Audience" *PC Magazine*, vol. 7, No. 16, p. 203; Sep. 27, 1988.
Davies, Mark: "Developing Combinations of Message Appeals for Campaign Management"; *Eur. Jour. of Marketing*, vol. 27, No. 1, pp. 45–63, 1993.
Gunning, "How to Take the Fog Out of Writing", pub. by Dartnell Corporation, date unknown, pp. 8–13.
Marcus *Graphic Designs for Electronic Documents and User Interfaces* (1992) pp. 46–47.
Maitland Graves *The Art of Color and Design* (1951) pp. 351–375.
*Color Combination Image Scale*.
Birren *Principals of Color*.

Primary Examiner—Gail O. Hayes
Assistant Examiner—Joseph Thomas
Attorney, Agent, or Firm—Robert Hutter

[57] ABSTRACT

A system evaluates the psychological effect of an image embodied in image data. At least one subset of the image data is identified by a visually-perceptible characteristic thereof. A point-score relating to the extent of the visually-perceptible characteristic is derived from at least one visually-perceptible characteristic of the identified data. The point-score is then applied to an algorithm relating to a predetermined psychological effect.

19 Claims, 10 Drawing Sheets

SYSTEM FOR EVALUATING A PSYCHOLOGICAL EFFECT OF A DOCUMENT

BACKGROUND OF THE INVENTION

1. Field of the Invention

The present invention relates to a system, which may be embodied in image-processing software, for evaluating a document having text and graphics. The document may be evaluated by certain psychological criteria, or a user may begin with certain desired psychological criteria and use the system to create a document according to these criteria.

When creating a document such as a poster, a page having both text and graphics, or a multi-page book having text, graphics, and chapter and section headings, there will be created in the document not only the text of the document, but also an overall visual impression which transcends the text of the document. The overall visual impression is typically used to "help" the information in the text to be communicated. To take a simple example, in creating a poster announcing an event, it is helpful that the title of the event be placed in large, conspicuous letters, and that the location and time of the event be clearly marked, for example, by placing the information in large block type with a border around it, or printing particularly important information in a highlight color different from the rest of the document. These purely visual clues aid substantially in efficient communication.

In more sophisticated cases, graphical information in addition to text can be used to further enhance communication. For example, a paragraph may be placed within a border; a paragraph may be placed over a color rectangle; stripes may be placed on the document to interact visually with the text; paragraphs may be highlighted with "bullets" or "dingbats," which are miscellaneous printing symbols. If a word-processing program enables the use of such graphical devices, the possibilities for making a particular document unique become multiplied considerably. On a deeper level, the specific graphical arrangement, whether in text or graphic or both, can itself convey a visual impression in conjunction with the text. For example, a circus poster and a death certificate are likely to have different arrangements of color, font, and symmetry. Thus, a user creating a document for a specific purpose will not only have a wide range of options for creating an overall visual impression with the document, but will often be concerned that the selected overall visual impression be consistent with the purpose of the text.

With complicated documents, such as multi-chapter textbooks, the overall visual impression, while typically not on the level of a poster, is nonetheless crucial for the efficient conveying of complicated information. For example, chapters should typically begin on their own page; section titles should be conspicuously set off, for example by a color subtitle; equations should be set off from the text; key words may be highlighted in boldface, italics, or color. In addition, it is typically preferable that multi-page documents, such as books, create a consistent and cohesive visual impression.

In a corporation having a large sales force merchandising complicated or various items, such as cars, computers, office equipment, etc., it is likely that a large number of different sales documents be prepared for different products and for different potential customers. In addition, these documents are typically updated fairly often, and for the sake of efficiency, it would be helpful if the layout of the various documents, and the overall visual impression thereof, be made consistent throughout several versions of a continually updated document. Consistency in the visual impression is valuable in retaining a "professional" look and in demonstrating to a customer or potential customer that different versions of, for example, a catalog represent a continuing and freshly-updated sales process. It would be helpful, however, if this updating could be handled in as automated a fashion as possible, with minimal disruption to the visual effect over successive generations of documents.

In the context of a single corporation or other organization producing a large quantity of different documents, there is also the necessity that the visual impression of several documents, no matter when they are created, create a consistent "family" effect and will appear to come from a uniform source, even if the various documents are developed by different groups within a large organization. For example, if a corporation having two sub-groups, located in different cities, it would be helpful if each sub-group could produce its own documents independently, but with the assurance that the documents released to the customer will appear to come from the same organization regardless of the specific subgroup. It would be helpful to have an automatic system to ensure that documents created by different people within an organization have a consistent visual impression.

The present invention is generally directed to an automated system by which a document having both text and graphical data therein may be created or evaluated for a desired psychological effect, or visual impression. The document in electronic digital data form may be acted upon by the system to yield a document having a visual impression which is suitable for the text, and/or consistent with other documents. Alternately, the system may be adapted to receive a quantity of text and/or other information in a raw form and output a document in which the text is set out according to predetermined rules of layout.

2. Description of the Prior Art

U.S. Pat. No. 4,873,643 discloses an interactive design terminal by which a user may create a custom imprinted article, such as a T-shirt. The terminal presents an ordered sequence of print design choices to the user, via a video display, and stores the results of the operator selections.

U.S. Pat. No. 4,800,510 discloses a system for designing the layout of computer-generated graphs. The user enters selected high level "design control parameters." Using these parameters, the program creates a graph based on predetermined data, in accordance with the particular graphical situation selected by the user.

U.S. Pat. No. 4,831,546 discloses a program for assisting in the design of, for example, factories having systems of piping and/or wiring therein, and produces a proposed factory layout consistent with the requirements of the designer. The designer specifies one of the specified layout objects, and another layout object which interferes with the specified layout object is found in a layout area. An economical loss imposed on the specified layout object attributable to the other layout object is evaluated. Thus, various alternatives in the layout of the factory may be presented to the designer for evaluation.

U.S. Pat. No. 4,881,197 discloses a system for composing and editing a document in which the geometry created by text may be incorporated into a text with a minimum of embedded commands. The user enters a desired format name and a desired font name, and the system adapts the layout of the text accordingly.

U.S. Pat. No. 4,923,314 discloses a thesaurus feature for finding synonyms of words as they are typed into an electronic typewriter. Each word in an electronic dictionary within the system is identified by a special code immediately following the word so synonyms may be readily derived from the electronic thesaurus, as necessary.

U.S. Pat. No. 5,111,392 discloses a program by which an arrangement of furniture pieces may be determined according to user requirements of storage, privacy and electrical elements. Further, the finish, color, and fabric to be used in the furniture can be determined. An updated cost and bill of materials can be provided by the system on the completion of each step of the design process.

U.S. Pat. No. 5,133,051 discloses a database publishing system using a plurality of microprocessors for flowing manuscript material such as text and graphics into predefined entities, making up the structure of a publication according to predetermined attributes associated with each entity. The structure and appearance of the publication can be defined in advance before entering the manuscript material making up the publication, so that manuscript material making up a plurality of publications can be in process at the same time in various processing stages in order to image the publications in assembly line fashion.

The book Graphics Design for Electronic Documents and User Interfaces by Aaron Marcus (ACM Press, 1992) at 46–47 describes an experiment in which C source code was redesigned according to a program incorporating principles of systems-space and information-oriented graphic design to obtain an "optimum visual solution."

The pamphlet "How To Take The Fog Out of Writing" by Robert Gunning (Dartnell Corporation) demonstrates a type of "point count system" for evaluating the readability of a given quantity of text.

Principles of Color by Birren (Van Nostrand) discusses general principles of color harmony in the graphic design context.

Graves, The Art of Color and Design (McGraw-Hill, 1951) is a further discussion of simple design rules which are useful in evaluating the overall visual impression of a document.

SUMMARY OF THE INVENTION

According to the present invention, there is provided a method of evaluating a psychological effect of an image embodied in image data. At least one subset of the image data is identified by a visually-perceptible characteristic thereof. A point-score relating to the extent of the visually-perceptible characteristic is derived from at least one visually-perceptible characteristic of the identified data. The point-score is then applied to an algorithm relating to a predetermined psychological effect.

DETAILED DESCRIPTION OF THE PREFERRED EMBODIMENTS

Figure 1:
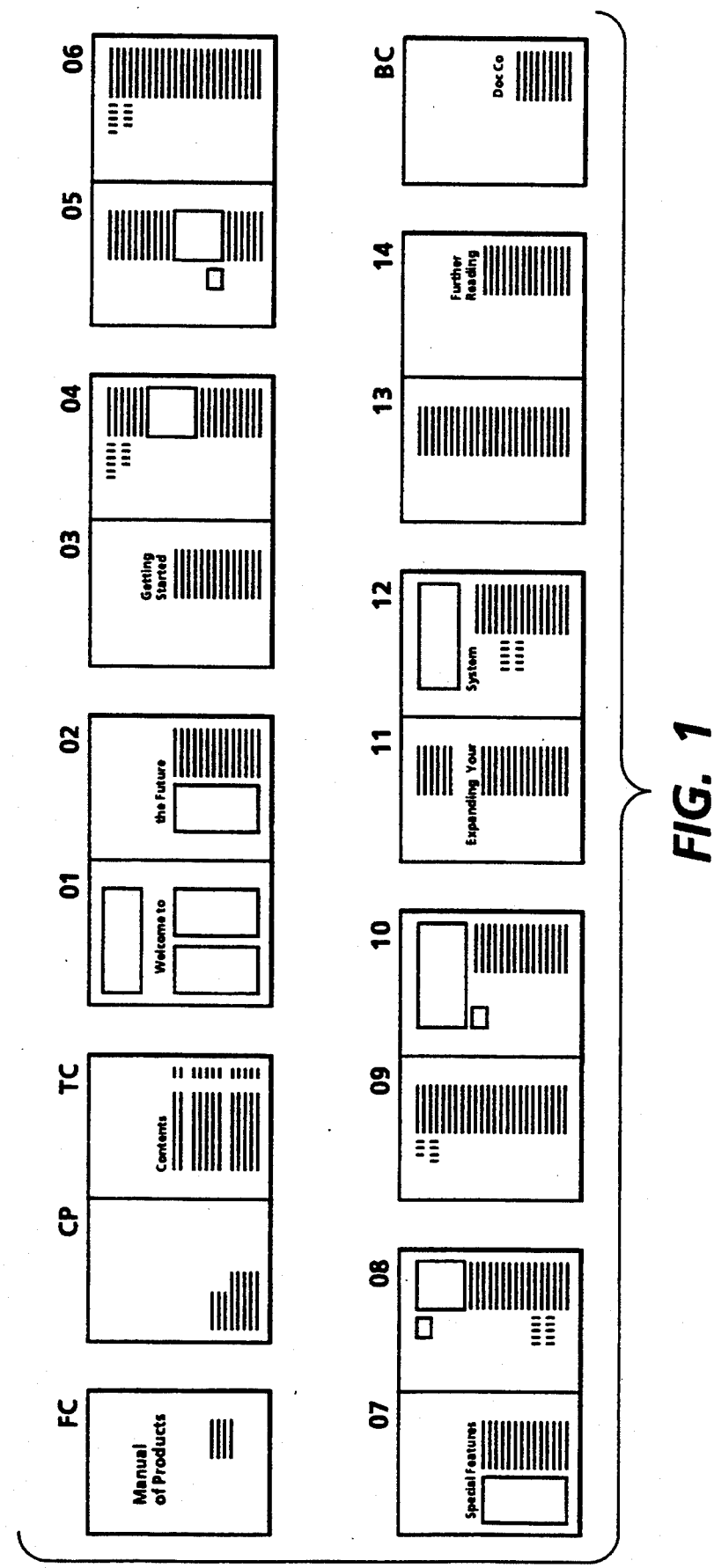
FIG. 1 is a typical set of images that would be found in a multi-page booklet demonstrating a certain purpose of the claimed invention.

FIG. 1 is a simplified view of the pages of a document in the form of a 16-page booklet having front and back covers. In FIG. 1, the pages and cover surfaces are laid out by "visual aspects" which for this purpose is defined as a portion of a hard-copy document which is visible to an observer at any one time. In the case of this booklet, the visual aspects are either the front or back cover, or the series of two-page spreads formed by facing pages as the book is read. Establishing these visual aspects will be important when evaluating the overall visual effect of the document, particularly as it relates to the unity, balance, or symmetry of the document as it is seen by a reader. In the case of a poster, for example, the visual aspect will be simply the surface of the poster. In a more sophisticated printed document, such as a magazine having fold-out pages, the concept of the visual aspect may in turn become more complicated.

The example booklet of FIG. 1 includes a front cover shown as FC, an inside cover shown as IC, pages numbered from 01 to 15, and a back cover BC. As can be seen, the visual elements on the pages in this example booklet include title-sized large text, regular-sized text (shown as horizontal lines), "pull-quotes" adjacent the text (shown here as short vertical lines) which are typically of a slightly larger size than the main text and which may also be in a special highlight color different from the text, illustrations or photographs (shown as rectangles), and picture captions (shown here as small dark rectangles). The various pages of the booklet shown in the example exhibit any number of layout options a designer, given a quantity of text and pictures, could select for a particular overall visual or psychological effect. For example, the margins of the text portions can be symmetrical or asymmetrical relative to each page; chapter titles may extend across two pages or occupy several lines on one page; chapter titles may be disposed at the top or at the middle of each two-page spread; illustrations may be placed above or below chapter titles; various pictures may or may not have captions therewith; pull-quotes may or may not be present, and may or may not "balance" other visual items in the visual aspect; the darkness of the chapter titles, pull-quotes, or even whole pages can be selected in various combinations; and the selected colors of any visual element may or may not be chosen to interact with the dominant colors within a given set of illustrations. It is thus apparent that even a relatively small number of possible visual items to be used in the document open up any number of possibilities, adding up to an overall visual effect; and, as will be seen below, an overall visual effect can be evaluated and chosen in view of a desired psychological effect.

An important feature of the present invention is its ability to evaluate a document comprising one or more visual aspects, by optically detecting the visual items therein, and then evaluating these visual items in light of predetermined psychological effects. The system begins with the purely visual evaluations of the "visual items" (e.g. blocks of text of a given type, location and nature of pictures, format of headings and titles, borders and frames) within the aspects and analyzes the presence and locations of these items in terms of a basic set of information relating to what shall be called the "visual elements". These elements are basically descriptions of the configuration of items within the aspects. A well-accepted set of these elements are: line, value, color, pattern, shape, and direction. Having compiled a set of information relating to these elements in regard to a document in question, the system can then and evaluate this data in view of what shall be called "visual principles." These principles are the visual effects which result from the interaction of elements. Whereas elements are objectively determined by an optical analysis of the document, principles may have some degree of subjectivity associated therewith. However, the mere fact that such principles may be in part based on subjective considerations does not mean that the existence of these principles in a given document cannot be determined from an objective analysis of the elements. A commonly-accepted list of such principles are: unity, conflict, dominance, repetition, alternation, balance, harmony, and gradation. These visual principles, in turn, can be weighted and evaluated objectively, in view of a desired psychological effect. Although the criteria of to what extent which visual principles go into a particular psychological effect may ultimately be a subjective determination, once again the analysis of a particular document in view of these subjective criteria can nonetheless be made conducive to an objective, mathematical method.

Figure 2:
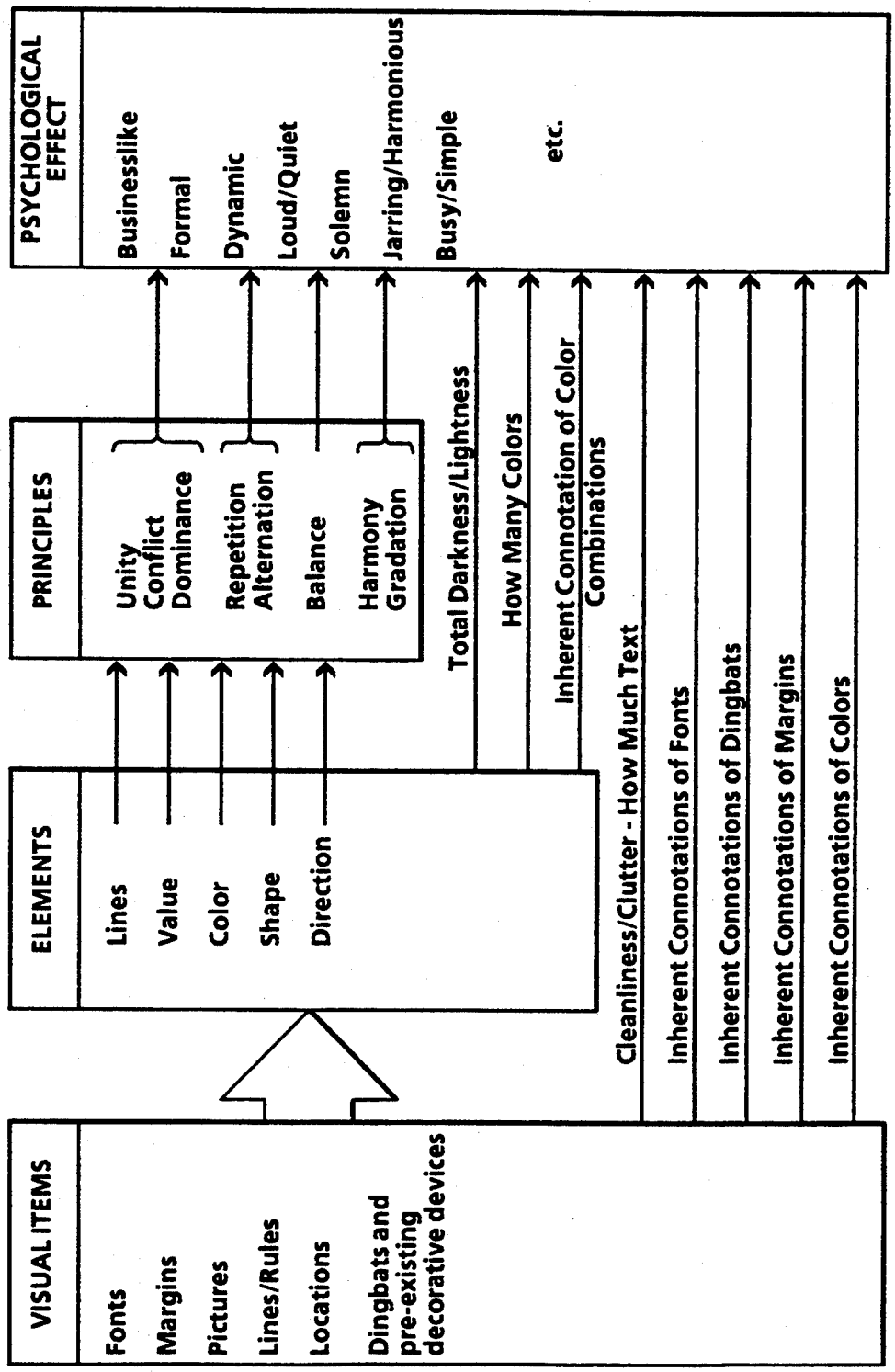
FIG. 2 is a diagram showing the interaction of visual elements, visual principles, and inherent portions of a document, as they relate to the psychological effect induced by the document.

FIG. 2 is a graphic summary illustrating how the ultimate psychological effect of a document is effected to various extents by the nature of visual items, the visual elements created by the items together and separately, and the visual principles created by the elements. As can be seen, in the illustrated conception of the underlying theory of the present invention, the many levels of visual analysis all ultimately go the psychological effects. In one example, the use of certain fonts, or the fact that so many words are compressed onto a single page, will be visual items with a direct bearing on the psychological effects. For example, putting so many words of text of a certain size onto a single page will create a clutter or even illegibility, which is an inherent psychological effect; it is typically a psychological effect which is desired to be avoided, but it is a psychological effect a graphic designer would want to know about. Further, certain fonts will have an inherent connotation leading directly to a psychological effect, such as the use of an old English font for a "traditional" look, or the use of a "Broadway" or "circus" font; certain fonts will create a consistent psychological effect more or less no matter how they are used, and this psychological effect can be addressed directly from the visual item analysis.

From the visual items which form the text data which is used to print the document, there may be derived the visual elements of line, value, color, shape, and direction, which are also directly and indirectly contributive of psychological effect in a document. For example, the total darkness or lightness of a document (that is, the value) may have a cognizable psychological effect, similarly, the presence of slanted or curved lines, for example, in the shape of a text block, may also have an inherent psychological effect. When the color of the document is considered, some very simple considerations may be taken into account to determine a psychological effect as well. For example, the mere number of colors, such as black and one highlight color, or the presence of a full range of different hues, may be evocative of a certain desired or non-desired psychological effect; it could be said that a plain bold red has an inherently "extroverted" psychological effect, while pale blue will have a more serene effect. Further, the mere presence of combinations of certain colors may directly have psychological effects, and merely having the system notice the presence of these colors and combination, without more, may be readily sufficient for determining a psychological effect. For example, the presence of yellow and black next to each other will create a "danger" connotation, red and green a "Christmas" connotation, and so forth.

The third level of analysis of a given document is the visual principles, shown in FIG. 2, which can be seen as being at another level of abstraction beyond the simple evaluation of an objective description of the document data. For example, unity, with its related concepts, conflict and dominance, is a quality which can be inferred from evaluating the visual elements of one item of the document, such as a block of text, relative to another visual item, such as a heading or title. "Unity" could thus be described as the sense that one visual item in the document is the center of attention, and the other visual items are visually "helping" the main item. If, for example, the title and the text were about equal in conspicuousness on a poster, there may be competition as to which visual item, the text or the title, is the focus of attention. Similarly, in a multi-page document, the fact that chapter headings in the first half of the booklet are one color and the chapter headings in the second half of the booklet are a different color, may detract from a sense of "unity" permeating the entire booklet. It will be noted that, for purposes of the present description, the precise definitions of the words used to describe visual principles are not given, but rather what is important is that once a definition of a word like "conflict" is decided upon, the mathematical algorithm to determine the extent of the quality is consistent. To look at the last column of FIG. 2, what determines whether a psychological effect is "businesslike," or "formal," "dynamic," or some other description is of course ultimately reflective of the judgment of the designer of the particular embodiment of the present invention. Nonetheless, once it is accepted that, for example, a "solemn" document will have certain visual characteristics, this accepted set of characteristics can be translated into one or more objective algorithms.

Figure 3:
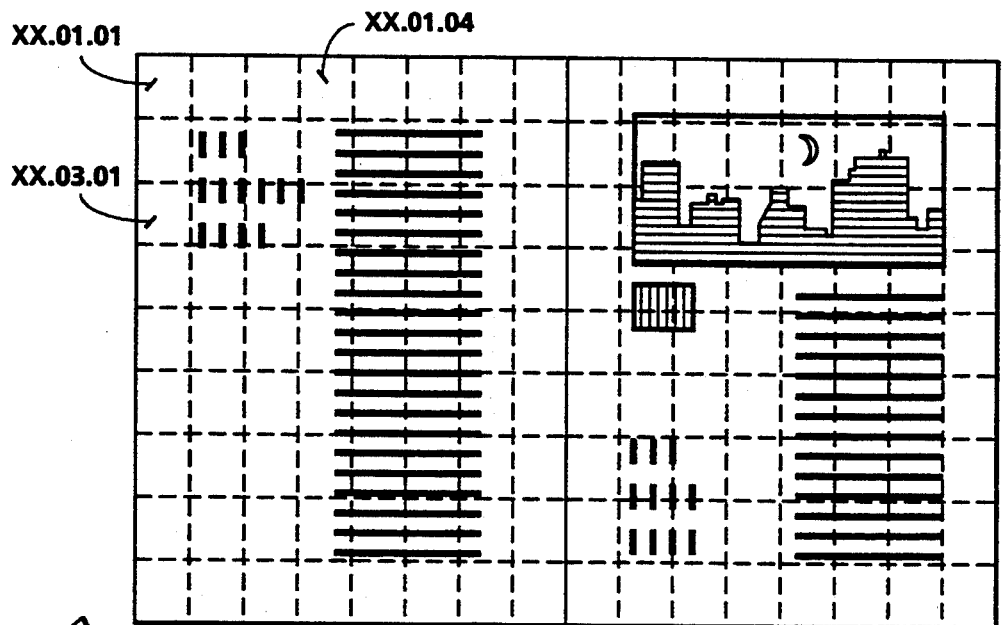
FIG. 3 is a representation of a typical layout of a document showing how a subsystem associated with the present invention can be used to "parse" a document.
Figure 3:
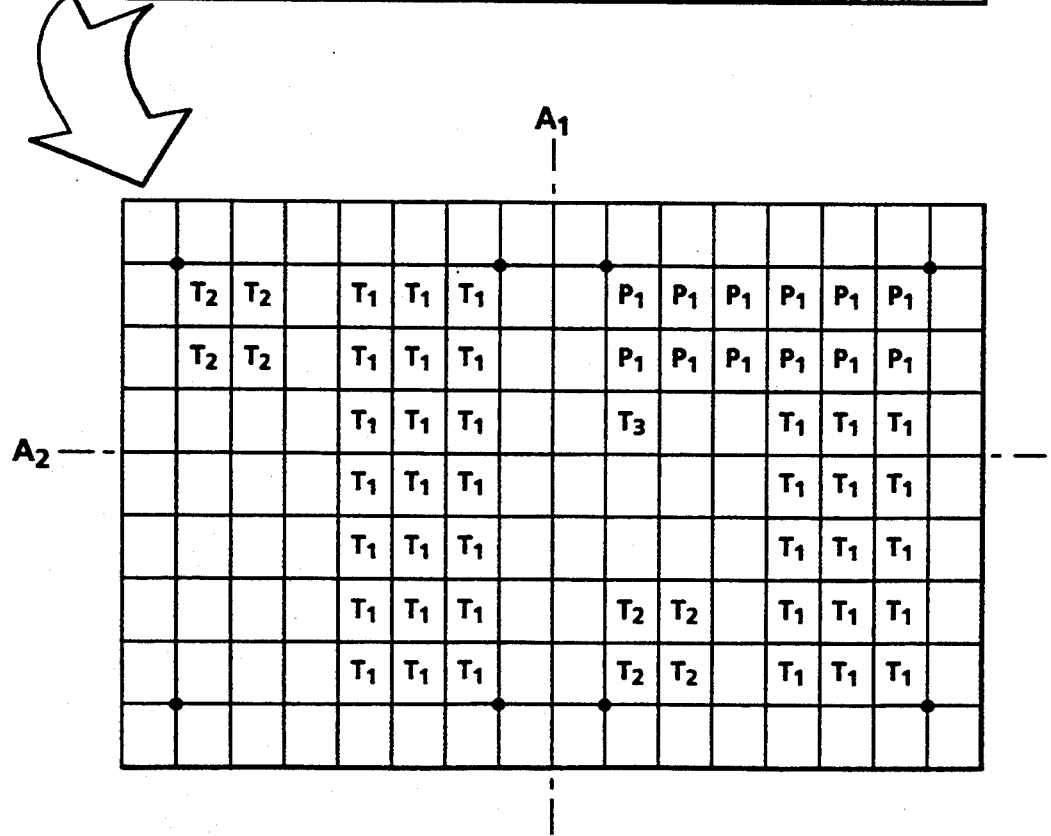

FIG. 3 shows a representative two-page spread aspect of a document which may be analyzed with the present invention, demonstrating how the present invention can be used to "parse" a given visual aspect and analyze it in view of certain criteria. FIG. 3 shows two pages having text (once again, shown as horizontal lines), pull-quotes (shown as short vertical lines), an illustration, and a caption (shown as a small dark area). Over the aspect is "placed," by electronic means, a grid wherein each square on the grid is identifiable by a coding system which identifies the page and position of the square with the document. Of course, with electronic documents, what actually happens is that a certain set of digital data associated with the pixels in a particular square on the grid is simply "flagged," by one or another means, so as to be identifiable with a particular square on the grid. For purposes of the present invention, it is not necessary that such a grid have a very high resolution, because in many instances an essential attribute of the visual analysis carried out by graphic designers is to consider only the "visual essence" of a document, such as by squinting at it, in order to evaluate its overall appearance. Thus, the grid need only be of resolution fine enough to isolate the general shapes of the major visual elements of a document. Certain of the squares in the grid of FIG. 3 are shown as having a representative type of coding associated therewith, each square having a unique code within the document. The example code shown in FIG. 3 shows a page number such as XX, and then a pair of coordinates indicative of the location of the square in the aspect. It follows that the index associated with each square in the grid will contain information which may be processed mathematically in order to allow an electronic system to perceive certain visual characteristics of the aspect. For example, in FIG. 3 the presence of pull-quotes and the upper left of the left-hand page and the lower left of the right-hand page could clearly be located by the index numbers of the squares these pull-quotes encompass. Similarly, the margins of the text can be reasonably approximated, for purposes of the system of the present invention, as occupying a set of squares having index numbers within certain horizontal and vertical ranges, as can the illustration and the caption. The identification of visual elements in the aspect with particular locations therein can thus be processed mathematically to determine the presence of visual elements, from which visual principles and ultimately psychological effects are derived.

For example, the pull-quotes in the example of FIG. 3 can be said to exhibit a "balance" because one pull-quote is in an upper left quadrant of the aspect, while another pull-quote is in a lower right quadrant. Because the two pull-quotes are of a comparable size, there is no dominance of one pull-quote relative to the other. Over a series of several pages in a booklet, it may be desired to make sure a pull-quote appears in a consistent place, at least on every other page, so that a repetition or pattern effect is created for a reader of the document. All of these visual principles can be mathematically defined and tested just given the fact that text relating to a pull-quote is found in certain identifiable squares in the grid. It would be apparent to one of skill in the art that algorithms could be derived for detecting these visual principles and others based on the image data combined with the grid data.

Carrying the analysis one step further, other visual principles can be called into play when analyzing the ensemble of different visual elements in a given aspect. For example, the appearance and location of the text blocks in the example of FIG. 3 can be compared to the pull-quotes and the illustration; and once again these visual principles of all of the elements working together can be detected mathematically from the combination of image data with the grid data. The blocks of text will not only have a certain size, but they will be located in a certain place on each page, and the text therein, because of its density, style, and leading, will thus have a certain "weight", or darkness, associated with them. If the blocks of text are much darker than either the pull-quotes or the illustration, the text will dominate the aspects and thus create a lack of balance with the pull-quotes. The fact that the text blocks extend slightly over the vertical axis of each page contributes to unity; if the left-hand edge of the text block were right along the vertical axis of each page, it could be argued that the unity of each page is inharmoniously bifurcated. The fact that, in the right-hand page, the illustration, text block, and pull-quote together press against all four corners of the page, also arguably creates an effect of unity for that particular page.

It will be evident that all of the above demonstrations of visual principles in the example of FIG. 3 could conceivably be expressed as mathematical algorithms with the image data and grid data input into the algorithms and the presence or extent of any of these principles being the output. Indeed, according to the present invention, a "point score" system by which a given document or portion of a document may be evaluated according to the visual principles, could be created, as will be explained below.

In order to carry out the basic visual analysis of a document to ultimately determine the psychological effects of the document, a great deal can be "learned" by a system of the present invention merely by taking the font and text data for a page of the document essentially at face value. That is, although the above-mentioned grid system may be used to take a "snap shot" of a document entering the system, because most documents are mainly made of text, and this text consists of predetermined fonts, sizes, weight, and color, arranged within a pre-existing system of setting up margins and tabs, it is certainly feasible to set up a relatively simple conversion algorithm by which all of the text data for a given document or portion of a document (fonts, sizes, spacing, color, and margins) can be converted to a set of data, such as the above-described grid data, that can be usefully analyzed by a system according to the present invention. Further, most simple graphic data, such as lines and borders, are also readily convertible to data for use in the system of the present invention, and in many cases with commercial graphics program, the various lines used for graphical purposes in commercially-available software packages are likely to leave a "trail" in a lower level of software indicating the location and orientation of, for example, a line. Thus, text and simple graphical data can be fed directly into the image analyzing system of the present invention.

The lower portion of FIG. 3 shows how the layout of the two-page spread in the top of the Figure can be perceived by the system of the present invention. In this example, the text, pull quotes, captions, and picture are each assigned one type of value for the whole grid square that the particular type of visual element takes up; once again, it is generally not crucial that a particular type of visual element take up an entire grid square. In this case, the main text is shown as squares marked $T_1$, the pull quotes are shown as another type of text (typically, in the large size or a different font) as $T_2$ and the letters for the picture caption of yet another type of size and font, as $T_3$. The grid squares corresponding to the picture are shown as $p_1$, and can be handled by the system in any number of ways, depending on the desired complexity of the system, as will be explained in detail below. The three types of text shown in this example can be known beforehand by the system, as having, for example, a particular "weight" (in general, darkness) when spaced in a certain way on a page. From the basic elements defined by the text in the picture, even from this relatively simple set of data in the lower portion of FIG. 3, numerous visual principles may be derived and evaluated. The table below shows how the the three types of type and a value for the area in the aspect corresponding to the picture, can be readily analyzed.

Because the properties of a given font available in a commercial software package may be known in advance, a system may use a look-uptable to recognize these individual fonts and type sizes as having a discernable "weight" when put on a page. In the example shown, this assigned weight is given on a scale of 0 to 7, because an eight-level scale is typically easily incorporated into system software. As shown here, the type $T_1$ is given a weight of 3 on this scale, type $T_2$ is given a two, and type $T_3$ a 5. In addition, the illustration may be given an estimated weight on the page for the entire illustration, in this case a 4 on the scale. However, it may be

|  | Name | Weight | Clutter | # of Grid Squares |
|---|---|---|---|---|
| $T_1$ | Times Roman 10 pt. | 3 | 1 | 30 |
| $T_2$ | Helvetica Italic 18 pt. | 2 | 2 | 8 |
| $T_3$ | Modern Bold 8 pt. | 5 | 1 | 1 |
| . |  |  |  |  |
| . |  |  |  |  |
| $T_N$ | Old English 24 pt. | 5 | 6 | 0 |
| . |  |  |  |  |
| . |  |  |  |  |
| $P_1$ | Picture | 4 | 4 | 12 | desirable, depending on the sophistication of the system, to divide the illustration further into dark portions and light portions whereby the single picture, shown here as an area P1, would itself be divided into distinct areas of light and darkness, such as if the picture were of a dark landscape over a bright sky.

In addition to an assigned weight which may be identified with a given font and size in a software package, another parameter which may be of interest to the system of the present invention is the extent of "clutter" or "busy-ness" associated with a given font. In the table, there is given by way of example a line for an "old English" type face which may be in the preexisting software package. This type face is very ornate, and in most common layouts would be used sparingly, only for major titles. (It may also have an inherent psychological effect, which may be relevant for certain applications.) There is shown in the table a separate column to define a "clutter" factor for various types. On the 0–7 scale, it can be seen that the Old English type face is relatively cluttered, particularly compared to the cleaner type faces. In a point-count system, such a high level of clutter may be wished to be avoided, and thus the clutter count may be used to evaluate the total legibility of a document. Because of the popularity of unified software packages having a predetermined set of fonts, the weight and clutter factors will be inherent with each type of font given a particular line spacing, and thus these weight and clutter values may be permanently assigned to the various fonts in the package, thus simplifying the programming requirements for setting up a system according to the present invention. In addition, many popular software packages for word processing may also include a pre-packaged set of "dingbats" or "clip art," which are bitmaps for commonly-used decorative devices, such as scrolls or flourishes, or simple pictures which are often used to embellish certain types of text, such as news letters. These dingbats as well may have assigned to them weights and clutter factors, which may be entered into further analyses of the document. Of course, many of these dingbats or clip art may have psychological connotations associated therewith, and thus the used of these devices may be "fed into" a total consideration of a psychological effect for the entire document.

The visual principles mentioned above can be in large part ascertained merely from the data from the simplification of the aspect in the lower portion of FIG. 3 in the following ways. First, the extent of UNITY and its related concepts CONFLICT and DOMINANCE can be ascertained by a simple analysis. For all of these visual principles, the essential question is: does one type of visual item (by which is meant, a contiguous block of material of a certain type, such as a block of type or a picture) dominate the entire aspect relative to other visual items? In the present example, the number of grid squares occupied by particular types of text or a picture, is distributed in the following proportions, in descending order: 30 ($T_1$), 12 ($P_1$), 8 ($T_2$), and 1 ($T_3$). The ratio 30:12:8:1 can be said to provide a useful evaluation of how one type of visual item, in this case text of the $T_1$ type, dominates the aspect and thus contributes to unity. If the aspect were rearranged to increase the size of the picture, for example, to change the ratios to something like, for example, 25:20:8:1, clearly there would be some visual "competition" between the $T_1$ text and the picture. Similarly, if the pull quotes of text $T_2$ were made larger to take up a comparable amount of surface area as the text, the reader may be confused on whether the pull quotes merely comment on the text, or whether the small text comments on the large quotes. Such a conflict, or lack of unity, or lack of dominance, is thus readily expressible in a comparison of the number of grid squares occupied by visual items of a given type. Further, the unity of a multi-page document can also be determined by comparing the ratios of various types of visual items among a series of pages, to see if the ratios remain generally within the same range. If, for example, a text of a certain text and size appears only on three pages in a 30-page document, there will clearly be a lack of unity in this sense; however, this lack of unity is not necessarily bad, but may contribute to or detract from some desired psychological effect of the entire document, in a manner which will be explained in detail below.

For all of these evaluations of the visual principles, no matter how they are specifically defined and expressed in algorithms within the program of the present invention, it should be emphasized that many of these visual principles can be evaluated with remarkable precision even without the step of applying the electronic grid. A system that is satisfactory for many purposes may be created largely by merely counting the number of characters of a given type per page of text; if the weight and clutter factors of each type of text are known in advance, many visual principles may be determined merely by counting the letters. For example, for unity, on a single page or aspect, the important question is whether a certain type of text, given its relative size and a number of letters, tends to dominate over other types of text in the amount of surface area the text of this type takes up. The ratios of number of letters of various types can be compared over several pages of a multi-page document to get a good idea of the graphical uniformity of the whole document. If there turns out to be a closeness of amount of space taken up by two different types of type, there may be a lack of dominance, or conflict. When color is added to the document, of course, another dimension of analysis, based on counting the number of characters of a given color, will be evident. The system could determine whether the ratio of characters of a given color are reasonably constant over numerous pages, and the direct psychological connotations of certain colors and color combinations can be evaluated based on the relative number of characters of a given color.

For REPETITION, this visual principle can be analyzed over a multi-page document by, mathematically evaluating the distribution of certain types of visual items. In the example of FIG. 3, it could be detected mathematically that the $T_2$ text invariably appears as in blocks of four contiguous grid squares, one block per page. Mathematically, this repetition could be expressed as a routine to determine the incidence of such four-square blocks on each page, to test a 1:1 relationship, and also to evaluate, if necessary, whether all of the occurrences of such a block are in the same column or row of grid squares. On a more general level, the principle of repetition can be applied to other visual items, even within solid blocks of text, as in a printed manuscript. For example, if a document-production system is capable of providing bold or highlight color within text, such as in chapter titles or section headings, the presence of special variations in font or highlight colors can be flagged and evaluated to determine whether a perceptible repetitive pattern exists, such as by evaluating whether the number of occurrences of such features appear in the text at a consistent rate. For example, in a team-composed manuscript in which various chapters are written by various persons, one person may decide to write text in a continuous flow of prose without organizing or chopping up the prose into smaller sections with conspicuous section headings, while another writer chooses to compose one chapter in more or less outline form, with bold or color headings which would create a repetitive visual pattern. The presence of pattern could be determined by use of the electronic grid, or alternately by applying a pattern-recognition routine to the characters in the text, for example by detecting the occurrence of "clumps" of bold, large-type, or highlight-color strings of characters in the text; in such a case, the determination will be: do these "clumps" occur at suitably regular intervals in the text? Further, how do these patterns interact with the pagination of the text in the document?

In single-aspect documents, such as a poster, the principle of repetition may be evaluated in other ways, particularly if colors are involved. In a poster having text and also some abstract designs such as lines or curves, small areas of a particular color, or relatively small areas of high darkness could be perceived through the grid squares as individual grid squares of high density. The spacing between the high density grid squares could be evaluated and the consistency of the spacing measured to evaluate the extent of visual repetition in the poster.

Similarly, as for the concept of BALANCE as a visual principle, the positions of the various visual items of a given type, can be evaluated in terms of the symmetry of these items relative to any number of axes or points within the aspect. One way of determining this symmetry is to divide the aspect with one or more axes, and count the number of grid squares associated with a certain type of visual item are on either side of this axes. The ratio of these counts on either side of the axis, which may be normalized so that the smaller of the two numbers is always the numerator of the fraction and wherein 1.0 would represent perfect symmetry, can be used to evaluate balance. The table below, which refers once again to the document in FIG. 3, shows how the various types of visual items $T_1$, $T_2$, $T_3$ and $P_1$ are evaluated by their symmetry through both the vertical axis A1, a horizontal axis A2, and a point at the intersection of the two axes, to determine the extent of radial symmetry through the quadrants formed by the two axes.

|        | $A_1$ Sym | $A_2$ Sym | Point Sym |
|--------|-----------|-----------|-----------|
| $T_1$  | .44       | .66       | .66       |
| $T_2$  | 1.0       | 1.0       | 1.0       |
| $T_3$  | 0         | 0         | 0         |
| $P_1$  | 0         | 0         | 0         |
| Weight | .63       | .63       | .79       |

It will be apparent that further axes, including diagonal axes, can be applied to the general principle. Looking at the first column of Table B, it can be seen that there are 18 grid squares of the $T_1$ type on the left of axis A1 and 8 grid squares of the $T_1$ type to the right of axis A1, yielding a "symmetry ratio" of 18/8=2.25, which may be normalized by taking the reciprocal, to yield 0.44. Needless to say, the higher this ratio, the more "symmetrical" the aspect is. There are four grid squares of the $T_2$ type on either side of the A1 axis, thus yielding the maximum symmetry ratio of 1.0. As for the $T_3$ caption type, and the $P_1$ picture, as these visual items appear only one side of the axis, the necessary symmetry ratio will be 0 in both cases. A similar analysis, comparing the ratios of grid squares of a certain type relative to either side of the A2 axis, is shown in the A2 symmetry column of Table B, and the point symmetry ratio, wherein the number of squares of a certain type in diagonally-adjacent quadrants formed by the axes, is shown in the third column.

Another type of symmetry which may be very important to a graphic design is a "weighted" symmetry through any axis; that is, instead of simply comparing the ratios of grid squares of a specific type, to give a darkness value to squares of a given type, based upon the density on the page, and then go through a weighted voting process to determine the symmetry of the distribution of weight or darkness in the aspect. In the present example, this can be done by counting the number of grid squares of a given type within each relevant side of an axis or point, and multiplying this account by the assigned weight of that particular type of visual item. Thus, by multiplying the number of grid squares of a certain type times the weight thereof from Table B, and adding up the total darkness for either side of an axis, the weight symmetry ratio can be determined in the manner of the following example, in the case of evaluating the symmetry of the document in FIG. 3 through axis $A_1$, the calculation is $(18\times3)+(2\times4)/(4\times12)+(5\times1)+(3\times12)+(2\times4)=62/97=0.63$. The other kinds of symmetry through other axes are shown in the table. Once again, the symmetry may be taken through any axis, depending on the sophistication of the system. Indeed, the axes for determining symmetry need not go half way through any given area, but symmetry can also be determined through an axis which divide a given area into one third and two thirds. Once this symmetry information is derived from this objective analysis of the grid squares, the overall symmetry of the document may be evaluated in terms of a desired psychological effect; certain types of documents may be desired to be highly symmetrical, while others may be desired to be highly asymmetrical, or "dynamic."

As for the visual principles of HARMONY and GRADATION, even in a monochrome document, these principles can be evaluated through objective means using either the electronic grid system, or alternately by counting the number of characters of a given type and taking notice of the area and general weight of an illustration to determine how much surface area is taken up by each kind of visual item. In general, harmony and gradation are reflective of the interaction of various weights within the document so that, while different weights can be perceived, the different visual items can work together. In general, this type of analysis can be done by evaluating the distribution of grid squares of certain weights within the aspect. For example, returning to Table A in the example of FIG. 3, it can be seen that the various weights of the types of visual items are shown on the 0–7 scale as 2, 3, 4, and 5. Further, the "center" values of this distribution, the 3-weighted type $T_1$, and the 4-weighted illustration P1, retain most of the grid squares, 42 out of 51; it could be said that the lighter $T_2$ type and the heavier $T_3$ type are used as a judicious amount of emphasis to contrast with the moderately-weighted large areas of text and picture, where most of the information is. Generally, this would be considered a good use of gradation for the conveying information with a certain amount of emphasis, but again, how "good" this distribution of gradation is will all depend on the ultimate purpose of the document. The ratios of how much surface area on the document is taken up with given weights is another type of objective data which is useful in evaluating a psychological effect.

It is very common, in the design of documents such as news letters, posters, booklets, and so forth, to enhance the text, not only with pull quotes, but also with individual lines of a preselected thickness, forming borders or portions of borders, for example, between a chapter heading and the beginning of the text. Many types of pre-packaged word processing software include simple graphics tools for embellishing the text in this way. Fortunately, because of the semi-automatic nature of creating these simple graphic devices within a word processing program, the visual effect of these lines can be evaluated by applying the information used to create these lines in the original document, and applying this line-creation information to the various visual principle algorithms very much in the same way plain text is analyzed. A line, depending on its thickness, will have a weight associated therewith, the use of a certain number of lines in a given aspect may create an amount of "clutter"; the spacing of lines within a single aspect will create a type of pattern which may be detected algorithmically; even if short lines are used, the presence of these shorter lines, for example to mark off pull quotes, can be scrutinized against axes of the aspect to evaluate the balance of their use; and of course lines may be of a highlight color. Further, the presence of curved or diagonal lines represent the visual elements of shape and direction, which in turn may be analyzed as visual principles, or evaluated directly for their psychological effect. For example, large diagonals are typically associated with a "dynamic" psychological effect, while colored curves tend to add a "creative" connotation to a document. Whatever the specific definitions of the psychological effects which are chosen, it will be apparent that the nature of lines of various shapes and colors is readily evaluated through a method very similar to the method described above for evaluating blocks of text.

From the above discussion of mathematical means for determining any given type of "symmetry", it will be understood, for purposes of the claim language hereinbelow, that any method for evaluating symmetry will involve identifying a certain subset of the image data with a preselected region within the entire aspect or image, and then evaluating how much of the image data is within and/or beyond this preselected region. In the case of simple symmetry, the selected region is simply one-half of the aspect or image; but there is no inherent reason why the preselected region should be any shape or size. Further, the above-mentioned "electronic grid" system, which may be used in a sophisticated embodiment of the present invention, is really a special case of the general principle by which symmetry is determined. In the "electronic grid" case, the selected region is simply one square in the grid, and the process of evaluating the image data associated with the area within the grid square is, in effect, repeated for every grid square.

When the software package for designing the documents is capable of providing color to a document, obviously the range of possible psychological effects will increase enormously. As mentioned above, certain individual colors may be deemed to have inherent psychological connotations, and specific simple combinations of colors may be deemed to have such connotations as well. Indeed, the mere number of different colors within a document, regardless of what those colors are, may very likely be deemed to have an inherent psychological effect: it is well accepted among graphic designers that certain types of "dry" information, such as a legal document, should be rendered with as few colors as possible; a document with information which is important but serious, such as safety instructions, is preferably rendered in black plus one highlight color, usually red; and documents directed to unsolicited potential customers of an organization should preferably be multicolored, but very often more than four colors may be deemed excessive. The point is, a relatively small amount of information, such as the mere number of colors of the document, may be quite valuable in evaluating a psychological effect.

With certain specific color combinations, however, particularly involving three colors plus black, certain combinations can be assigned specific psychological effect values. Because many software packages for the creation of graphics are capable of producing only a fixed set of predetermined hues, a system of identifying particular combinations of colors (which must be chosen from the possible set of hues) is conducive to a look-up table. The concept of assigning psychological values to particular color combinations is familiar in the art of graphic design, and any number of schemes have been proposed in the past for fixing the emotional value of certain colors and color combinations. One such scheme is promulgated by the Nippon Color and Design Research Institute, although, of course, any scheme can be used. The Nippon scheme classifies certain color combinations under headings such as "childlike," "dignified," "agile," and so forth. Of course, even if the ultimate selection of attributes of color combinations is ultimately subjective, these subjective attributions can be tested in an objective way. The Nippon scheme works in three-color combinations, but a system according to the present invention may be made more useful by being able to identify two of three colors in a document, or look for hues "close to" the colors of a certain heading in a scheme. For example, let us suppose that the color combinations of yellow, light green, and light blue are connoted as "useful." If the system notes the use of two of these three colors in document, the system could make a report that the "color palette" of the document is "useful but needs more light blue," for example. Alternately, if the highlight colors are only yellow and light green, the report could output any number of adjectives according to the Nippon scheme attributable to color combinations including particular shades of yellow and green. As it happens, looking at the Nippon scheme, the attributes associated with yellow, green, and another color include "enjoyable," "youthful," "fresh," and "tranquil" A graphic designer doing a specific project may find this list of words quite useful merely as a guide, and could of course override the system. Once again, because many graphics packages, particularly those associated with printers, are capable of producing only a limited number of preselected hues, the "limitations" of possible colors that may be output may also serve to make the system of evaluating the colors in a document more simple.

More sophisticated techniques for evaluating the colors in a document, provided a large range of colors may be output by the system to begin with, can be used as well. One well-known technique of evaluating the color in a document is the use of a "color wheel," one example of which is given in Graves, The Art of Color and Design (1951) at pages 351-375. The system will not be explained in detail here, but suffice to say that it would be apparent to one skilled in the art of programming how to automate such a system so that the objective evaluation of colors can be carried out by known data-processing means. Basically, the system proposed in Graves is to start with a reference "wheel" of hues, wherein blends of colors are arranged around the circumference of the wheel going in order from red, purple, blue, green, and yellow, and back to red, with blends of adjacent colors along the circumference. By selecting proper chords within the wheel, theoretically "harmonious" combinations of colors can be selected. It is proposed that certain chords are inharmonious, particularly if two colors which are too close along the circumference are selected, much in the manner that a disharmony is heard when two directly adjacent keys are struck on a piano. Such a system could take color combinations in raw form and evaluate them in terms of a theoretically harmonious palette.

Another dimension of evaluating a document in terms of color would relate to the aspects of "unity" and "conflict" among the several aspects of a large document. For example, the system could evaluate that the relative proportions of colors used on each page of a booklet should stay relatively constant throughout the document to retain the unity of the document; if, for example, the pages towards the front of a book are dominated by yellow, and pages elsewhere are dominated by blue, there will be a lack of unity in the document as a whole. Of course, such a lack of unity may be deliberate when delineating separate sections or chapters of the booklet.

Having explained the general purpose of the system of the present invention, what follows is a description of the operation of a system according to the present invention, for evaluating a set of image data in a practical application of word-processing and/or graphics software. It will be understood that the representative examples of how a typical document may be evaluated can be generalized for purposes of interpreting the claims.

In essentials, the system of the present invention evaluates the psychological effect of a document by means of a "point-score" system. As used herein, the term "point-score" shall mean a system in which a series of objective descriptions of the appearance of the document (as opposed to the purpose thereof) are collectively taken into account to yield a set of facts, or "point-scores," about the appearance of the document. Such point-scores may be simple binary determinations (e.g., "Is the document in black-and-white?"; "Are non-textual decorative devices used?") or more sophisticated numerical indices (e.g., "What proportion of the text is of a type size more than double the smallest type size?"; "What proportion of the text is on one side of the horizontal axis?"). The point-scores, being a set of numbers, can then be applied as needed into one or more algorithms for evaluating one or more psychological effects of the document.

While the basic "point-score" system is applied to objective descriptions of the appearance of an existing document, the present invention also proposes a parallel system by which the user can use objective determinations of the purpose of the document to determine which is the most relevant psychological test to apply the point-scores. Possible psychological tests are, for convenience, given one-word adjective names as evocative as possible of a given effect: "formal," "friendly," "loud," and so forth. Once one or more psychological-effect tests are selected to be carried out, the system takes into account a specific set of relevant objective "point-scores" by which the success of obtaining the certain psychological effect can be measured, i.e., how "formal," "friendly," "loud," etc. is the document? Ideally, each of, for example, fifty such psychological tests on the system will represent a unique set of objective tests as to the appearance of the document. Thus, the present invention proposes to detect and evaluate the visual characteristics of a document, and then apply the detected visual characteristics to tests for specific psychological effects.

Figure 4:
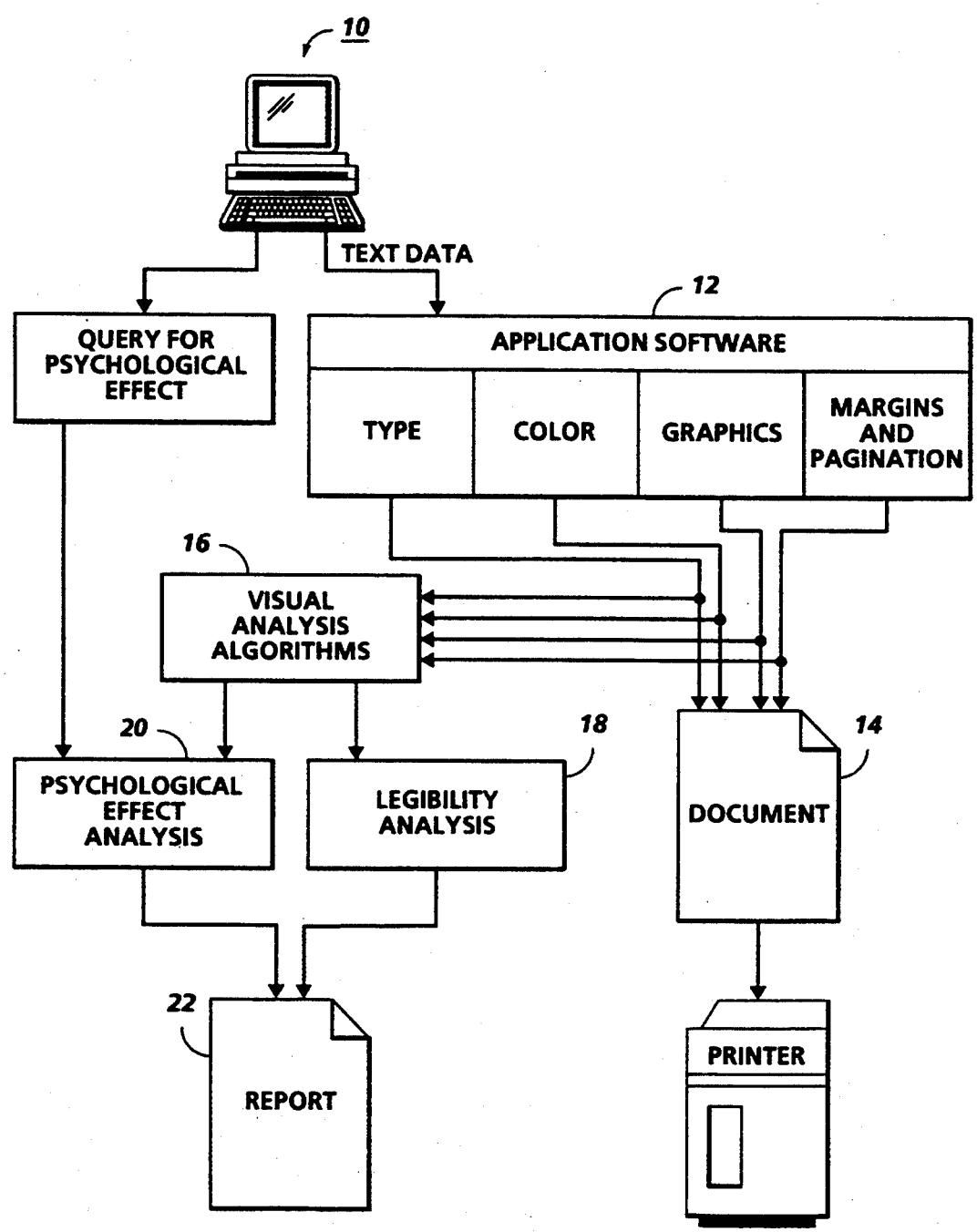
FIG. 4 is a systems diagram giving an overview of the operation of a system according to the present invention.

FIG. 4 is a simplified systems diagram showing how a system for evaluating the psychological effect of a document, according to the present invention, can be incorporated with word-processing applications software in the context of a user creating a document on, for example, a personal computer, and then printing out the document on a printer. In FIG. 4 is shown generally a word processor 10, having a keyboard and screen on which a document may be composed by a user, using common application software such as, by example and not by limitation, Microsoft Word ®, MacWrite ®, Claris Works ®, or any type of word-processing software. This software may be located within the personal computer 10 itself, or elsewhere in a network system, and is shown in the diagram as application software 12. Within any application software 12, there will be separate "tools" which a user may use in order to create a document. Among these tools are a selection of type fonts (sets of letters definable by font, size, style, etc.), color, graphics (such as the creation of lines, circles, or shapes) and a system of pagination, by which the text may be divided into any number of pages. It is generally intended that the system for evaluating the psychological effect of a document, according to the present invention, be essentially "parasitic" to the application software. The application software can be used in a normal manner to create the document, and only after the final document, here shown as 14, is created by the application software 12, will the system of the present invention be called into action. However, as mentioned above, many types of application software will have buried therewithin places in the application program where information relevant to the visual analysis carried out by the program of the present invention may be easily "siphoned off" for rapid analysis. A person of skill in the art in designing such an application software will be able to identify portions of the application software where relevant data will be relatively easy to find, and this data is merely read by the program of the present invention without in any way altering the function of the application software. Examples of information which may be siphoned off from the application software include: how many characters per page are of a given font, size, and style; what colors are being used; and so forth.

The characteristics of the document created by the application software not only go into the document 14 itself, but are also "observed" by the system of the present invention by applying the attributes of the document to a set of visual analysis algorithms shown generally as 16. These algorithms are those which evaluate the visual elements of the document (line, value, color, shape, direction), and incorporate the observed elements as needed into determining the visual principles of unity, conflict, dominance, etc., in the manner described above. From these algorithms are derived the "point scores", which represent an objective analysis of the visual items in the document 14, which can then be applied to an evaluation of the psychological effects of the document. In addition to evaluating the psychological effects from the visual analysis algorithms 16, a more basic legibility analysis, here shown as 18, may be executed as well. This legibility analysis would probably be much simpler than the psychological analysis, and is based on more objective determinations, based on the document data, going to the basic legibility of the document. Basically, the legibility analysis 18 is designed to catch any egregious graphical mistakes which would render the document unreadable. For example, such a legibility analysis would flag the presence of more than 300 words on a page, the printing of text in a too-light color, errors in pagination (e.g., a legal-size image trying to be placed on a letter-sized page), and any other errors which are obviously the result of mistakes rather than calculated design choices. Further examples of such "legibility" tests are, by way of example and not by limitation:

How many words are in each aspect of the document?

What is the ratio of words per unit area for a text block of a given size? (Blocks of very small text, such as containing legal boiler plate, are typically allowable provided the text block is sufficiently small.)

What is the total clutter score for all the text blocks?

What is the proportion of relatively high-weight text relative to medium- or low-weight?

Is the text in a sufficiently dark color? (Yellow or orange text, for example, may be inherently difficult to read.)

When analyzing a document 14 in terms of its psychological effect, as is done in portion 20 of the system illustrated in FIG. 4, a fundamental question is: Under what psychological criteria is the document to be evaluated? As alluded to above, there may be any number of possible psychological effects which may be desired by a graphic designer, and, however these psychological effects are defined, these effects can all ultimately be translated into a set of objective tests of the document. The question then becomes that of determining which psychological effect test (i.e., set of objective criteria) the user desires to use. Unfortunately, because the objective criteria of the tests are ultimately in the service of the user's subjective desires, some steps must be taken to create a "consensus" between the user and the parameters of the system. For example, if the psychological effect analysis 20 is capable of one test of the "mellowness" of the document the question is not only, what does "mellow" mean?, but, how can the user be sure that the meaning of the word "mellow" is appreciated?

Figure 5:
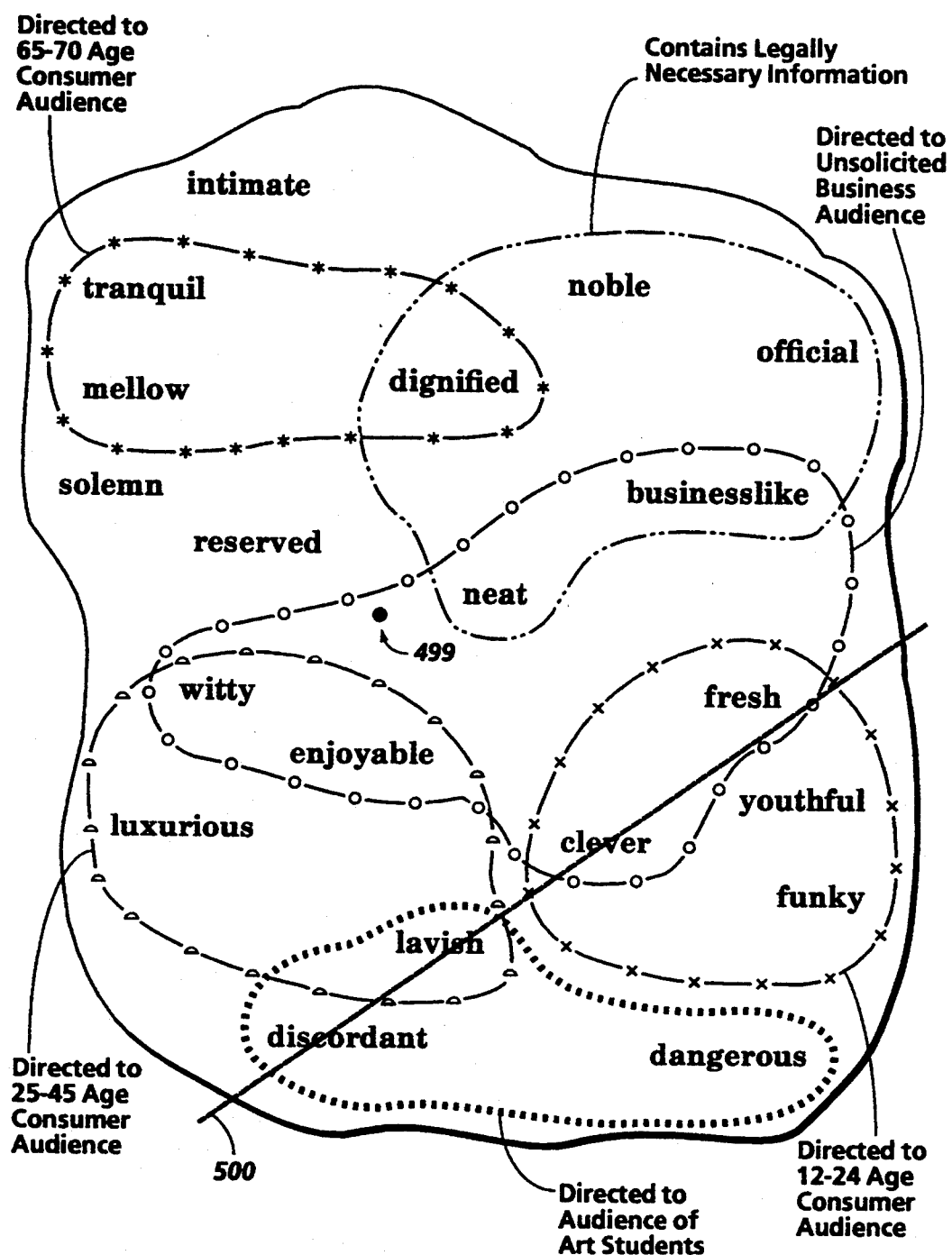
FIGS. 5 and 6 are, respectively, Venn diagrams illustrating the psychological-effect test selection method carried out by the user in one embodiment of the present invention.
Figure 6:
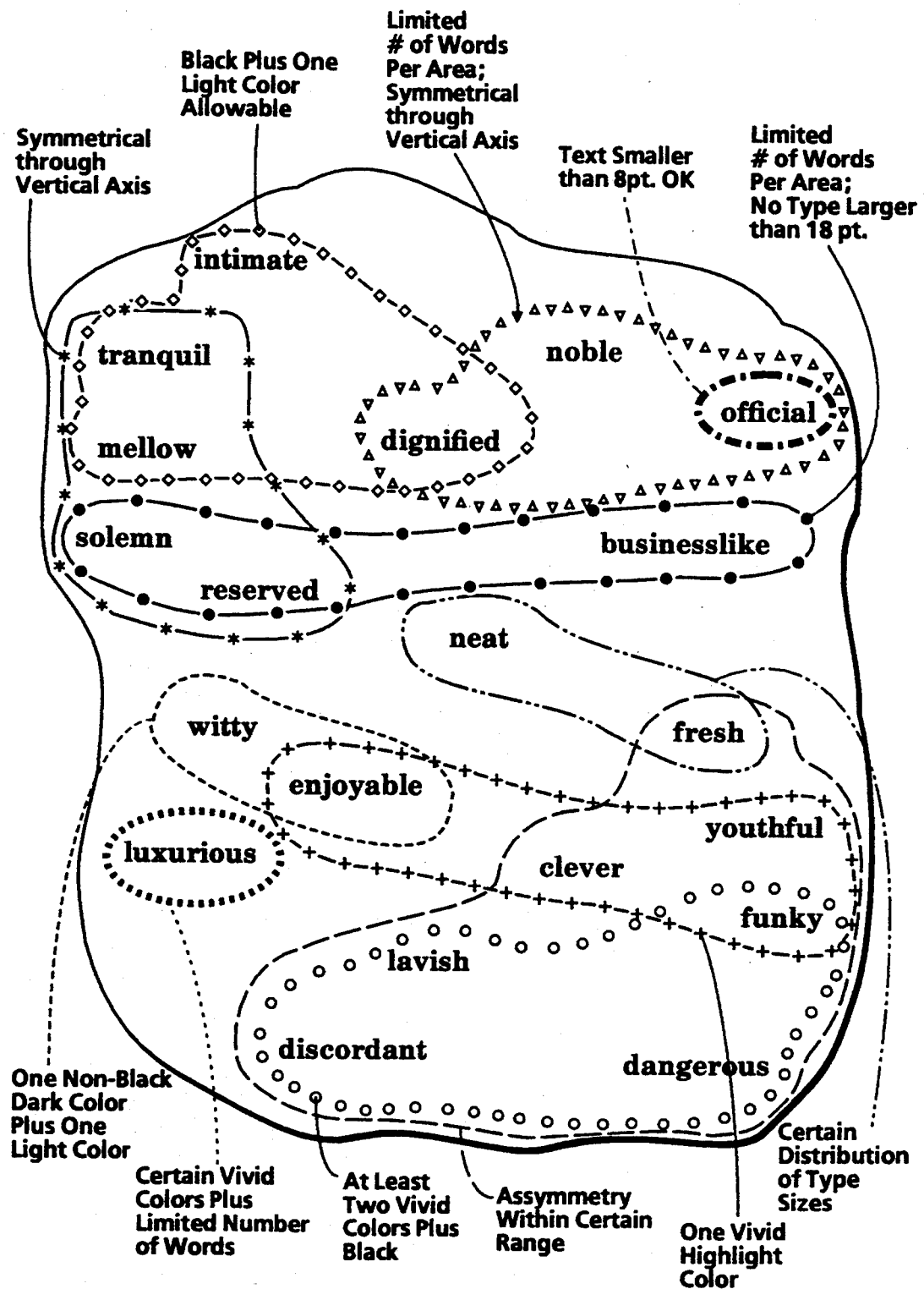

To this end, there is proposed as part of one embodiment of the present invention a query system by which a set of objective questions may be asked of the user to determine what type of psychological effect is most suitable for a given purpose. This psychological effect, which is identified by an adjective name ("mellow," "neat," "fresh," etc.) corresponds to a unique set of objective tests applied to the visual items of the document. Thus, the adjective name of the psychological effect becomes a "bridge" between a set of objective questions directed to the purpose of the document, and another set of objective tests directed to the actual physical properties of the document. The principle of the queries system is best illustrated by FIGS. 5 and 6 which are, respectively, Venn diagrams illustrating first the selection of appropriate tests (adjective name) by the answers to objective questions, and, in FIG. 6, illustrations of how sets of tests each have associated therewith any number of visual properties of the document. Both FIGS. 5 and 6 include, placed within the outer solid border, a complete set of possible tests, identified by adjective names. There may be any number of such tests in a given system, and each name in the full set represents a set of tests to be applied to the document.

In order to determine which of these tests are most profitably applied to a given document, the user is queried by a prompt system with objective questions about the purpose of the document. Samples of such queries can be seen on the outside of the solid border, e.g., Is the document directed to a unsolicited business audience? Is the document directed to consumers in the 25–45 age group ? etc. It will be seen that each of these sample objective questions has associated therewith a certain subset of adjectives, which is to say a certain subset of all the available tests. For example, if the document contains legally necessary information, the appropriate test that would be cited would be dignified, noble, official, businesslike, or neat. Similarly, if the document is directed to a audience of consumers over the age of 65, the appropriate tests would be mellow, tranquil, and dignified. It will be noted that, in this example, a document containing legally necessary information which also is directed to a 65 plus consumer audience, should most definitely be "dignified," as that adjective falls into both categories. Similarly, if a document is directed to an unsolicited business audience but may also be directed to consumers between ages 12 and 24, the appropriate tests are whether the document is either "fresh" or "clever". Any number of subsets may correspond to any number of objective queries about the document. For example, if there are ten objective questions answered a certain way by the query of the user, it would be profitable to take the "top five" of adjectives that appeared most often in the queries and use these as the most suitable tests.

Further by way of example, some useful queries to choose the correct psychological test may include:

Is the document intended to be publicly posted?

Is the document intended for people who know the author?

Is the intended audience initially indifferent to the document?

Is the document supplying information that has already been requested by the audience?

Is the document intended to persuade the audience to do something it may not want to do?

is the document an invitation for the audience to spend money?

Is the document an invitation for the audience to invest money?

Is the text of such a complexity that text blocks must exceed 200 words?

Does the text contain safety information? If so, is the safety information the focus of the document?

Is the purpose of the document, or what the document talks about, essentially entertainment?

Once the decision on which subset of psychological tests are most appropriate for a given document, the document is then subjected to the user-selected tests. FIG. 6, it will be noticed, contains the exact same set of psychological tests within the large border, but, instead of being divided into subsets by queries as to the purpose of the document, is divided into subsets based on objective visual criteria of a document. For example, for a document to be either "neat" or "fresh", the system will test for a certain distribution of type sizes, such as having a certain portion of all of the letters in the text be 24 pts. or larger. In addition, in order to test "fresh" the document should include, in addition to black, at least one vivid highlight color; however, it may not have two vivid highlight colors, because two vivid highlight colors would bring the document into "lavish-funky-discordant-dangerous" range.

To take a complete example, using the subsets of FIGS. 5 and 6 assume there is a document containing legally necessary information which is directed to an unsolicited business audience. After these queries, the most appropriate adjectives selected by the system are "neat" and "businesslike," because these two terms appear in both subsets. But again, there may be dozens of such queries each related to a specific subset, and it may be more advisable to pick a list of adjectives that appear most often, as it is unlikely that one adjective will appear in every single selected subset. Once it is decided that "neat" and "businesslike" are the desired attributes of the document, the test turns from that of FIG. 5A to that of FIG. 6. Finding the terms businesslike and neat in FIG. 6, there can be seen that certain objective criteria are associated with each attribute. In order for the document to be "businesslike," for example, none of the type of the document should be larger than 18 pts.; this is, incidentally, an attribute also shared with "solemn" and "reserved" documents. At the same time, a document that is "neat" should have a certain distribution of type sizes, such as a certain proportion of letters being of 24 pts. Of course, there is some conflict here, as the type should be smaller than 18 pts. to be "businesslike," but should have some 24 pt. letters to be "neat". However, the system itself is not concerned with these conflicts, but will report back on these conflicts in the report, shown in FIG. 4 as 22. It should be noted that the evaluation shown in FIG. 5B is taken against an existing document which has been proffered to the system of the present invention by the user to test for these two specific psychological effects. If the tested document has letters of 24 pts. or larger, the report will say that "DOCUMENT HAS LETTERS OF 24 PTS. OR LARGER; NOT BUSINESSLIKE"; alternately, if the document has 24 pt. letters, but all the letters are the same size in the document, the report may read "DOCUMENT LACKS DISTRIBUTION OF TYPE SIZES; NOT NEAT" Although an individual reader may disagree with the specific recommendations, the point is that the user has selected these tests of psychological effects, and can make use of the evaluation as he or she will. If, furthermore, the document in question is black with one highlight color, because this attribute is not appropriate with any of these subsets, the report will read "DOCUMENT INCLUDES HIGHLIGHT COLOR IN ADDITION TO BLACK; NOT NEAT, NOT BUSINESSLIKE".

Further by way of example, some objective criteria which may be observed in order to evaluate the total psychological effect may include:

What fonts are being used?

What is the distribution of character sizes? and What is the distribution of surface areas in the image "covered" by characters of a given size?

Is more than X% of the text in bold or italic?

Are more than X% of the sentences or sections more than Y words long?

Is the text arranged vertically symmetrically?

Is any text arranged "flush right"?

What proportion of the surface area is taken up by pictures?

Is the text directly next to the picture(s) greater than X pt. size?

Does the text size progressively decrease going down each aspect? Or is the larger type usually between blocks of smaller type?

How many colors are being used? What specific colors and color combinations are being used?

Are there any diagonal or curved lines present in the document?

It will be noticed that even in the relatively small sample of subsets shown in FIG. 6, individual tests may be associated with one or more objective attributes, if they should fall in the overlap areas. For example, a "funky" document should have a degree of asymmetry within a certain range, and should also include at least two vivid colors plus black. Similarly, a "clever" or "youthful" document should also have this asymmetry within a certain range, but should be limited to one vivid highlight color. There may be other objective criteria, not shown in FIG. 6, to delineate the shade of meaning between "clever" and "youthful." Ideally, each adjective in the set should represent a unique combination of objective criteria.

Figure 7:
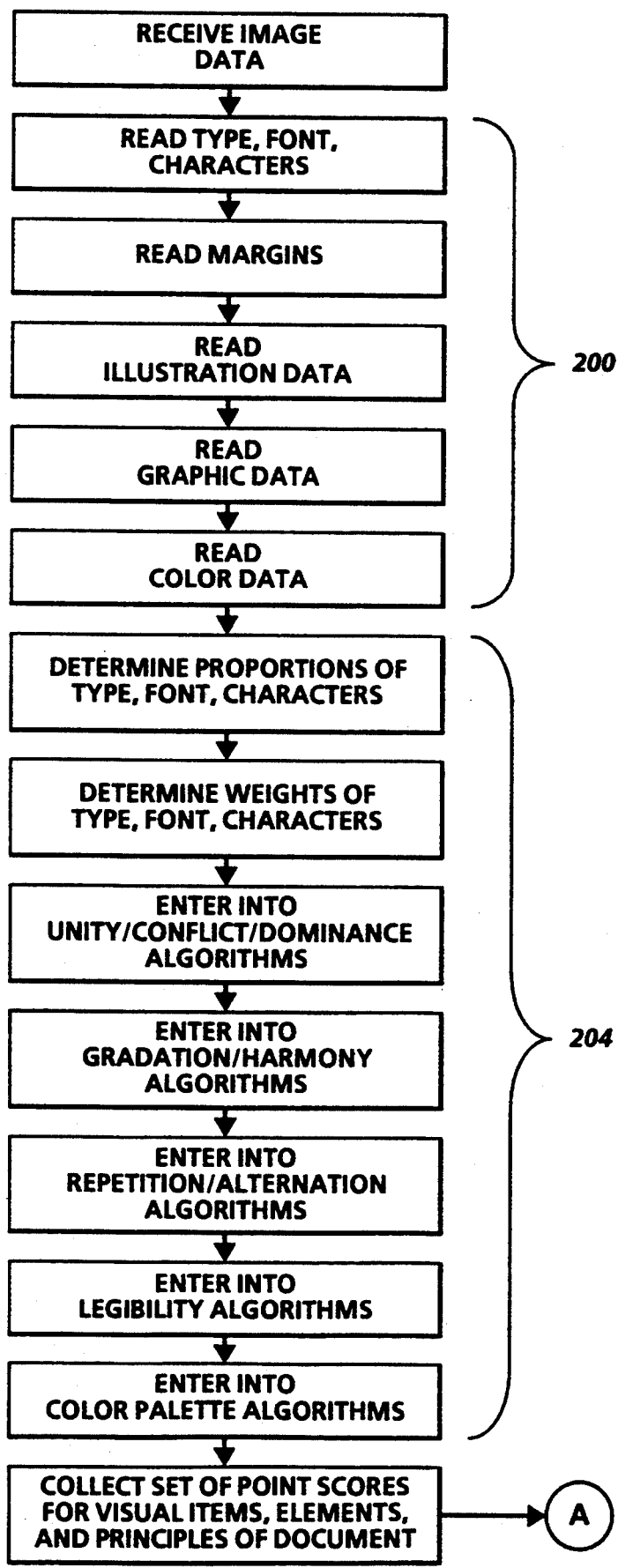
FIGS. 7 and 8 are flow diagrams illustrating the operation of one embodiment of the present invention.
Figure 8:
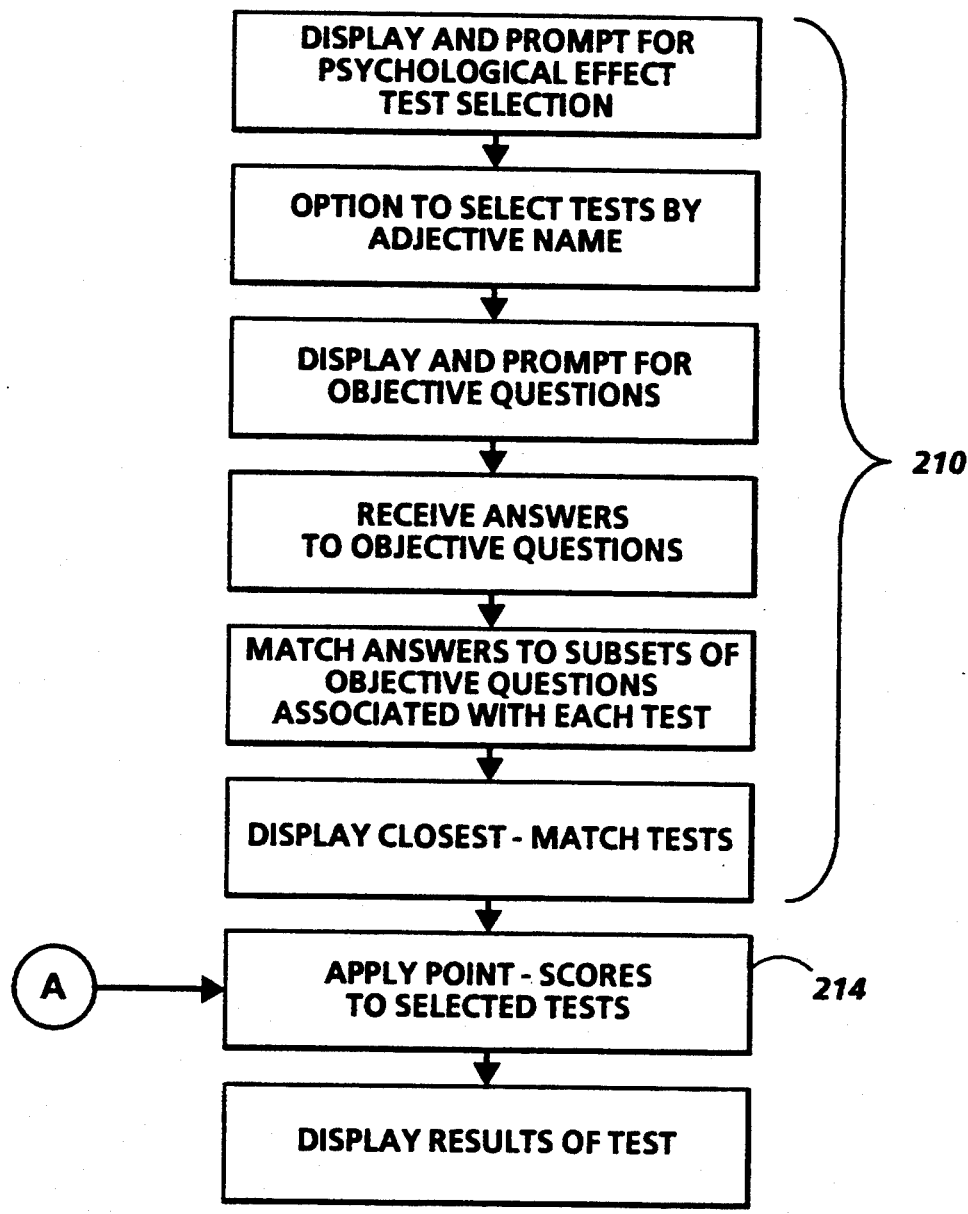
Figure 9:
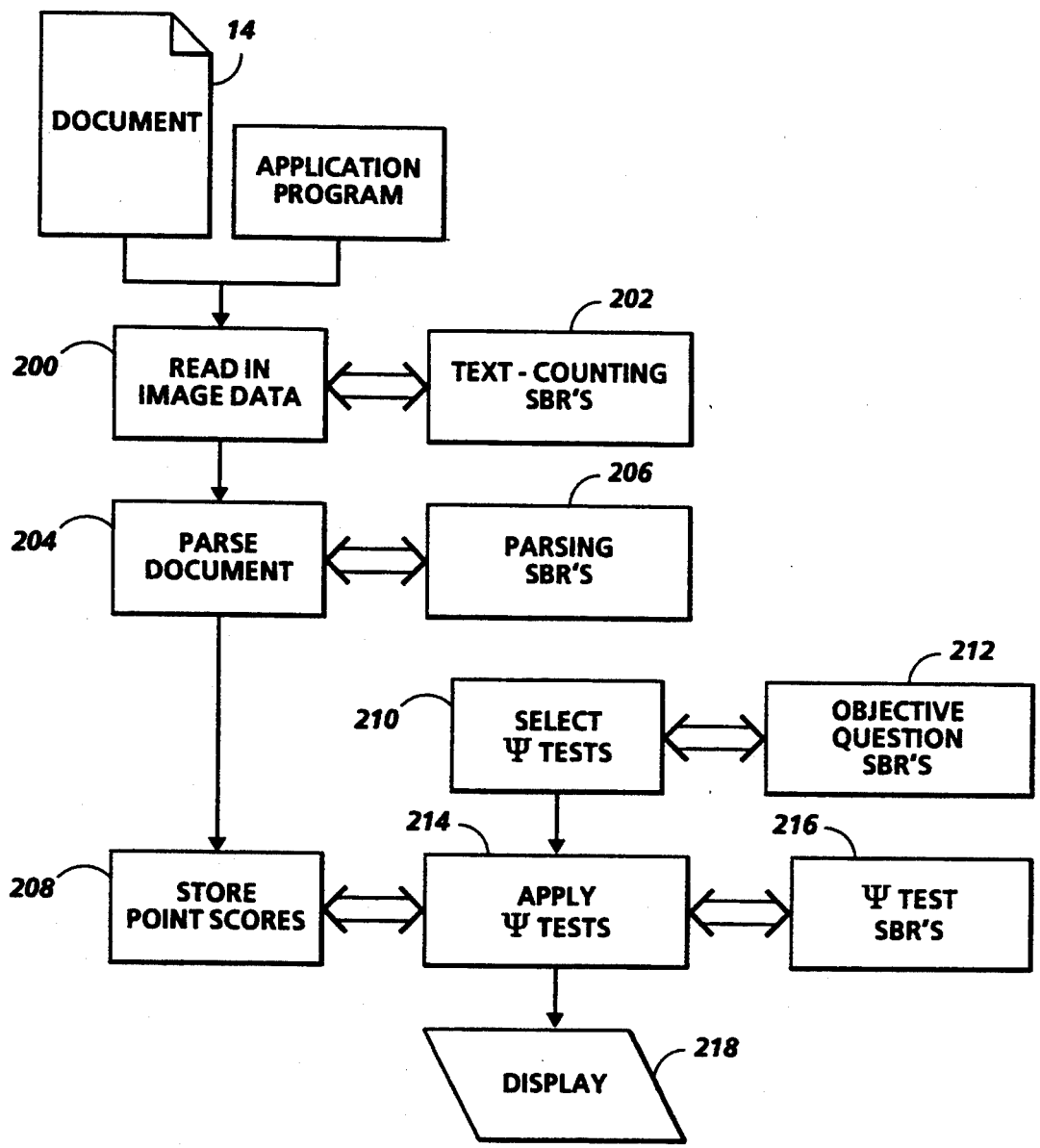
FIG. 9 is a systems diagram showing the essential elements of a system for carrying out the method of the present invention.

FIGS. 7 and 8 are flowcharts describing in detail the entire function of a system according to the preferred embodiment of the present invention, wherein the data associated with a document to be tested for the psychological effect thereof is "parsed" in the manner described above, in terms of its visual elements and principles, and also wherein the most suitable test for the most pertinent psychological effect are selected by the user. FIG. 9 is a somewhat simplified version of the flowchart in FIGS. 7 and 8 showing how the "main thread" of the steps taken by the program in FIGS. 7 and 8 in turn call upon other fixed sources of subroutines and data as needed to carry out the method of the invention.

Turning to FIGS. 7 and 8 in detail, the process of parsing the image data begins with receiving the image data. As used herein, "image data" refers not only to the actual contents of a given document, but may also include data relating to the document which has been "siphoned off" an application program which was used to create the document. Such extra data from the application program may include, for example, the locations and orientations of decorative lines, and also the dimensions of margins used within the document. From whatever source derived, all of the relevant data is then read into the main program as is shown by the group of instruction boxes in FIG. 7 marked as 200. This group of read-in functions, in which the raw material from the document is processed, may call upon certain subroutine for efficiently counting the image data and determining, for example, what proportion of all the letters in the document are of a certain font or certain type, or of a certain color, etc. These counting and proportioning subroutines are called upon at will as needed by the program, and are shown in the more general diagram of FIG. 9 as counting and proportioning subroutine 202.

Once the relevant data relating to the document is collected, a more sophisticated type of analysis may be carried out with not only the actual data itself but also with the counted statistics about the image data which have been obtained by the subroutines 202. In the group of steps shown as 204 in FIG. 7, the data relating to the image is then entered into algorithms which relate to the visual principles of unity, conflict, dominance, etc. in a manner which has been generally described above. Of course, specific techniques for determining the extent of certain of these visual principles will depend on the precise definition a programmer wishes to use for a principle such as "unity;" however, whatever the precise definition, algorithms generally relating to these visual principles will be apparent to one skilled in the art. The section 204 of the process will call upon a set of subroutines for the deliberate purpose of analyzing the image data as needed, such as for evaluating symmetries through various axes of the document, and such subroutines can be stored in a special subroutine set for parsing shown as 206. It will be apparent to one skilled in the art that the information actually processed by the parsing subroutines 206 may work on either actual bitmaps of the document, or, for a cheaper system, can infer the nature of the document by the bare list of information relating to the document, particularly as regarding types, fonts, and margins. Whether to have the subroutines 206 operate on the actual bitmaps of the images will depend on the generally desired sophistication of the system.

Once the image data has been parsed and the total visual characteristics of the document have been analyzed, there will be left a set of "point-scores" relating not only to the analyzed visual principles of unity, balance, etc., but also point-scores which may relate to more basic characteristics of the document, such as how much text is in the document, and also what colors are used and what fonts are used. All of these point-scores may be used to be applied to algorithms for determining the psychological effect of the document. These point-scores are generally temporarily stored in a given location such as 208.

The parsing of the visual characteristics of the document is, at the beginning of the process, separate from the process by which a user of the program of the present invention would use to select the relevant psychological effect tests for analyzing the document. The steps carried out in this test-selection process are shown as 210 in FIGS. 8 and 9 respectively. The test-selection process 210 will call upon a fixed data base of objective questions, which, although probably invisible to the user, will each be associated with a unique subset of psychological tests to be applied to the image data, and these objective questions are maintained in a fixed data base 212.

Finally, once the desired psychological-effect tests are selected, the relevant tests are applied to the data by entering in the derived point-scores from memory 208 into the psychological tests, much in the manner of FIGS. 5 and 6. This step is shown in FIGS. 6 and 7 as box 214. When the psychological tests are applied, the point-scores are read out from memory 208, and the relevant set of objective tests for each psychological-effect test are read out as needed from a fixed set of subroutines 216. Then, after the relevant psychological tests have been carried out on the point-scores, the results are displayed, as shown at box 218.

The selection of psychological-effect tests and the implementation thereof in a system of the present invention is readily conducive to various "fuzzy logic" techniques which have become prevalent in recent years. Returning briefly to the Venn diagram of FIG. 5, the various psychological tests within the main set are shown as "floating" relative to one another within the set, but various tests may be construed to overlap to some extent, so that, for example, a desired psychological-effect of a document may be to have a document which, in the example of FIG. 5, is 50% "neat," 25% "reserved," and 25% "witty." Such a document would be "located" in FIG. 5 at the point marked 499. In practical terms, this may mean that when all three psychological tests (neat, reserved, and witty) are applied to the given document, the document will score a relatively high score under the "neat" test, and a proportionately smaller but still significant extent on the "reserved" and "witty" tests. Using the conventions of fuzzy logic, such a phrasing of the psychological-effect of a particular document is quite common, and in this example a document found to be too "witty" under a first test relative to reserved and neat may be made more neat at the expense of being witty, to obtain the desired proportion of these psychological effects.

Figure 10:
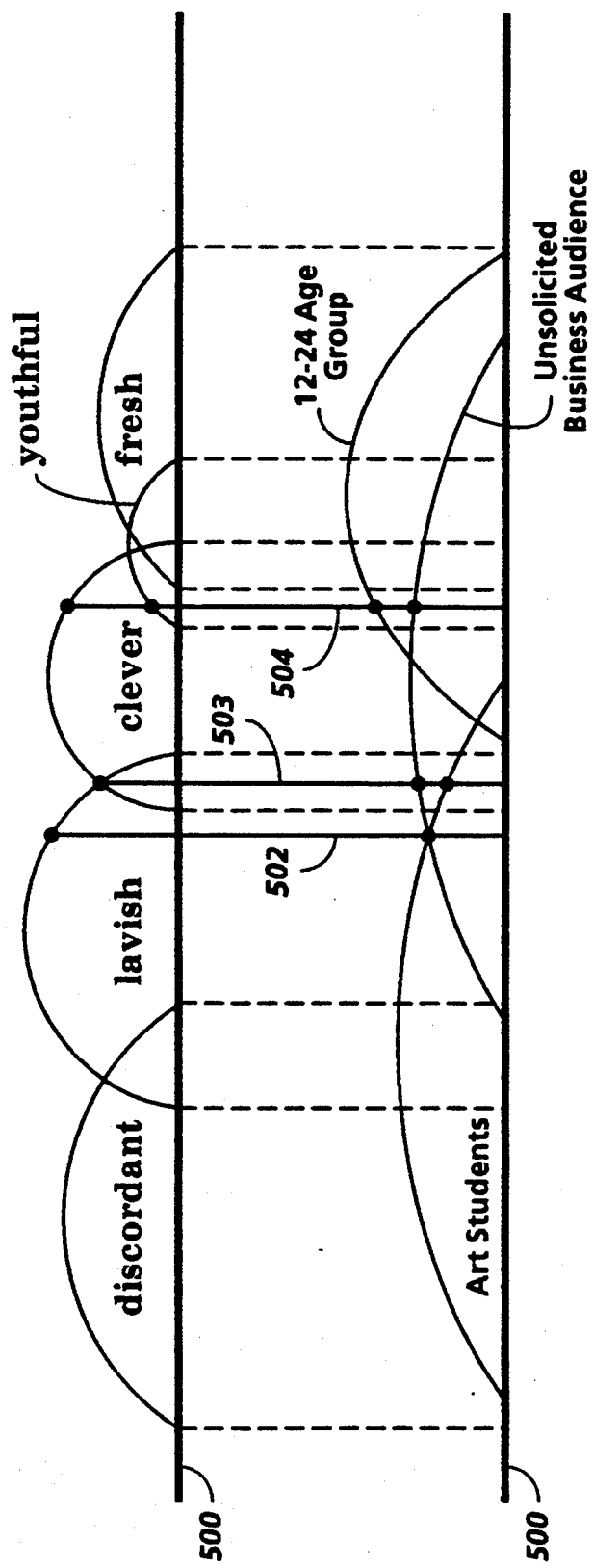
FIG. 10 is a symbolic cross-sectional view through line 500 in the Venn Diagram of FIG. 5.

FIG. 10, which refers to line 500 drawn through the Venn diagram of FIG. 5, generally illustrates how fuzzy logic techniques can be used not only to make compromises among different psychological tests, but among different purposes of a given document. As different psychological tests within the Venn diagram of FIG. 5 may be construed to overlap, the different document purposes will, of course, overlap as well, as can be seen in FIG. 5. However, using fuzzy logic techniques, the relative influence of different document purposes may be taken into account as well. FIG. 10 shows the line 500 shown through the Venn diagram of FIG. 5, showing both the extent of psychological tests and the extent of document purposes to be not only bordered subsets in the Venn-diagram sense, but also as "bubbles," in a dimension orthogonal to the Venn diagram, which overlap to generally complementary extents. The functions forming these "bubbles" can conceivably be described mathematically within software. It will be noted that the line 500 is shown twice in FIG. 10, once to show the relative extents of the psychological tests through which the line 500 passes, and another to show the superimposed extents of various document purposes, in the lower line.

To take a practical example of a fuzzy logic technique as applied to the purpose of the present invention, consider a document which is a flyer for advertising a T-shirt printing machine. It is decided by the creator of the document that he wants to appeal equally to both art students who may be interested in using the machine, and an unsolicited business audience, which may be interested in being franchisees for the machine. Looking at the "bubbles" of art students and the unsolicited business audience in the lower line 500 in FIG. 10, it appears that the overlap by which there should be equal interest by art students and an unsolicited business audience occurs at line 502 where the extents (that is, the vertical axes relative to line 500) for art students and the unsolicited business audience are equal. Following line 502 to determine the correct psychological test of interest, this line is directed entirely to the "lavish" test. However, if it is decided that slightly more emphasis toward the unsolicited business audience will be more important than the art students, the line of interest may move to 503, where the extent of the unsolicited business audience is approximately twice that of art students. Following line 503 to the top line 500, is shown that this point along the line 500 calls for a document which is to equal extents "lavish" and "clever." Therefore, an ideal document for this proportion of purposes would score equally well under these two tests.

If it is decided that the intended audience for the document is not art students specifically, but mainly the 12–24 age group, although some interest in an unsolicited business audience is also desired, the relevant line along line 500 may be 504. As can be seen in FIG. 10, line 504 represents a point in which the extent of the 12 to 24 age group is twice as much of interest to the user than the unsolicited business audience. Following line 504 to find the relevant tests, it can be seen at the top of FIG. 10 that two "bubbles" are intersected with "youthful" and "clever." It will also be noted that the extent of the "clever" test is approximately twice that of the extent of the "youthful" test for line 504. Thus, to test the document for the desired proportion of an audience (for instance, 67% of interest to the 12–24 age group, and 33% of interest to an unsolicited business audience) the document should be to some extent in the "clever" set and to a lesser extent in the "youthful" set; in more practical terms, the score on the clever test for the document should be twice, or at least significantly greater than, the score on the youthful test. Of course, using even more sophisticated fuzzy logic techniques, the actual proportions of the point scores for the various psychological tests will be weighted and normalized as needed to perfect the system to a user's desires.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. An automated method of evaluating a psychological effect of an image embodied in image data, comprising the steps of:
   accepting image data in the form of digital data, each digital datum corresponding to at least one pixel in the image;
   polling the image data and identifying at least one subset of the image data by a visually-perceptible characteristic thereof;
   deriving from the identified image data a point-score relating to an extent of image data associated with the visually-perceptible characteristic in all the image data;
   providing a plurality of selectable algorithms, each algorithm relating the visually-perceptible characteristic to a predetermined psychological effect;
   displaying a set of objective questions and prompting for answers thereto, the set of objective questions being organized into a plurality of subsets, each unique subset of questions relating to a specific algorithm;
   receiving a combination of answers relating to a subset of objective questions;
   selecting an algorithm based on the subset of questions receiving a predetermined answer;
   applying the point-score to the selected algorithm relating the visually-perceptible characteristic to a predetermined psychological effect, yielding a value indicative of the presence of the psychological effect in the image; and
   displaying a report indicative of the presence of the psychological effect in the image.

2. A method as in claim 1, wherein said identifying step identifies an identity of a font associated with the subset of image data.

3. A method as in claim 1, wherein said identifying step identifies a character size associated with the subset of image data.

4. A method as in claim 1, wherein said identifying step identifies a presence of a color associated with the subset of image data.

5. A method as in claim 1, further comprising the step of calculating the proportion of the image surface related to a subset of the image data, based on the font, character size, and number of characters of the font and character size.

6. A method as in claim 1, further comprising the step of determining the optical weight associated with a subset of image data.

7. A method as in claim 1, wherein the deriving step includes a step of comparing a visually-perceptible characteristic of two subsets of image data and deriving a point-score based on the comparison.

8. A method as in claim 1, wherein the deriving step includes a step of comparing the relative optical densities of two subsets of image data, and deriving a point-score based on the comparison.

9. A method as in claim 1, wherein the deriving step includes a step of comparing relative surface areas associated with two subsets of image data, and deriving a point-score based on the comparison.

10. A method as in claim 1, wherein the deriving step includes a step of comparing a proportion of a subset of image data associated with a subregion of the entire image with a proportion of the subset of image data not associated with the subregion, and deriving a point-score based on the comparison.

11. A method as in claim 1, wherein the deriving step includes a step of determining the number of colors in the image.

12. A method as in claim 1, wherein the deriving step includes a step of determining the identity of a combination of colors in the image.

13. A method as in claim 1, wherein the applying step accepts as an input an inherent psychological effect of a font associated with the subset of image data.

14. A method as in claim 1, wherein the applying step accepts as an input therein an inherent psychological effect of a combination of colors in the image.

15. A method as in claim 1, wherein the applying step accepts as an input therein an extent of symmetry through a predetermined axis of image data within the image.

16. A method as in claim 1, further comprising the steps of:
selecting a plurality of algorithm;
applying the point-score to at least one algorithm to obtain relative values of psychological effects associated with the selected algorithms.

17. A method as in claim 1, wherein the image comprises a plurality of aspects, and further comprising the steps of:
determining the proportion of each aspect identified with each of a plurality of types of image data;
comparing the proportions of each aspect identified with each of a plurality of types of image data among a plurality of aspects; and
deriving a point-score related to the consistency of the proportions of each aspect identified with each of a plurality of types of image data among a plurality of aspects.

18. A method as in claim 1, further comprising the steps of:
identifying a subset of the image data with a predetermined subregion within the image;
determining the proportion of area within the subregion identified with at least one type of image data; and
deriving a point-score related to the proportion of area within the subregion identified with at least one type of image data.

19. A method as in claim 18, further comprising the steps of:
comparing the proportion of area within the subregion identified with at least one type of image data to the proportion of area outside the subregion identified with the at least one type of image data; and
deriving a point-score related to the relative proportion of area within the subregion identified with at least one type of image data to the proportion of area outside the subregion identified with the at least one type of image data.

* * * * *